(12) United States Patent
Santosuosso

(10) Patent No.: US 7,475,064 B2
(45) Date of Patent: Jan. 6, 2009

(54) OPTIMIZING A UNION DATABASE QUERY

(75) Inventor: John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 449 days.

(21) Appl. No.: 10/948,775

(22) Filed: Sep. 23, 2004

(65) Prior Publication Data

US 2006/0064407 A1    Mar. 23, 2006

(51) Int. Cl.
G06F 7/00 (2006.01)
G06F 17/30 (2006.01)

(52) U.S. Cl. ............... 707/4; 707/1; 707/2; 707/3; 707/5; 707/6

(58) Field of Classification Search ........... 707/1–3, 707/5–6, 4
See application file for complete search history.

(56) References Cited

U.S. PATENT DOCUMENTS 7,120,623 B2 * 10/2006 Ganesan et al. .......... 707/2
2002/0198726 A1 * 12/2002 Kiernan et al. ............ 705/1
2004/0153435 A1 * 8/2004 Gudbjartsson et al. ..... 707/1
2005/0228779 A1 * 10/2005 Chaudhuri et al. ........ 707/3

OTHER PUBLICATIONS

Jason Couchman, "Oracle, OCP Introduction to Oracle 9i: SQL Exam Guide", published in 2001, p. 153-154.*
Craig S. Mullins, "DB2 Developer's Guide", Fifth Edition, published in May 2004.*

* cited by examiner

Primary Examiner—Jean B. Fleurantin
Assistant Examiner—Hares Jami
(74) Attorney, Agent, or Firm—Derek Martin

(57) ABSTRACT

An apparatus and method optimize a UNION-type query, where the query has common components on both sides of the UNION-type operator. The UNION-type expression is analyzed to determine if the expression can be optimized, and if so, common portions on both sides of the UNION-type expression are extracted and the expression is reformulated so the common portions on both sides of the union expression are only run one time.

9 Claims, 4 Drawing Sheets

C1=4 AND (C2>6 OR C3!=8)

| Predicate Expression | | | |
|---|---|---|---|
| Logical Expression | Relational Expression | Unary Expression | Boolean Expression |
| AND<br>OR<br>NOT<br>UNION | <<br>><br><=<br>>=<br>=<br>!= | isNull<br>isNotNull<br>exist<br>NotExist | TRUE<br>FALSE |

FIG. 2

Select * from Table1 where C1=4
AND (C2>6 OR C3!=8)

FIG. 3

C1=4 AND (C2>6 OR C3!=8)

FIG. 4

OPTIMIZING A UNION DATABASE QUERY

BACKGROUND OF THE INVENTION

1. Technical Field

This invention generally relates to computer systems, and more specifically relates to apparatus and methods for improving access to data in a computer database.

2. Background Art

Database systems have been developed that allow a computer to store a large amount of information in a way that allows a user to search for and retrieve specific information in the database. For example, an insurance company may have a database that includes all of its policy holders and their current account information, including payment history, premium amount, policy number, policy type, exclusions to coverage, etc. A database system allows the insurance company to retrieve the account information for a single policy holder among the thousands and perhaps millions of policy holders in its database.

Retrieval of information from a database is typically done using queries. A database query typically includes one or more predicate expressions interconnected with logical operators. A predicate expression is a general term given to one of the following four kinds of expressions using one of the four kinds of operators (or their combinations): logical, relational, unary, and boolean, as shown in FIG. 2. A query usually specifies conditions that apply to one or more columns of the database, and may specify relatively complex logical operations on multiple columns. The database is searched for records that satisfy the query, and those records are returned as the query result.

In the prior art, a query containing a UNION statement would cause the database to run the query components on each side of the UNION operator and then combine the results. This can be very costly in computer time if there are common components on both sides of the UNION operator that are being executed twice. Without a way to reduce database query time to improve system performance, the computer industry will continue to suffer from excessive delays in database accesses.

DISCLOSURE OF INVENTION

In accordance with the preferred embodiments, an apparatus and method optimize a UNION-type query, where the query has common components on both sides of the UNION-type operator. As used herein, a UNION-type operator and UNION-type expression includes other operators and expressions such as UNION All, INTERSECT, and MINUS. For simplicity, the use of the term UNION is used hereinafter, but the term hereby expressly includes other UNION-type expressions and operators, including those listed above. In the prior art, the database query optimizer would run each side of the UNION query and then combine the results. In the present invention, the UNION expression is analyzed to determine if the expression can be optimized, and if so, common portions on both sides of the UNION expression are extracted and the expression is reformulated so the common portions on both sides of the union expression are only run one time.

According to a preferred embodiment, a database query optimizer processes SQL expressions in a database query to determine if UNION expressions can be optimized that have common components on both sides of the UNION expression. The query optimizer identifies the UNION expression that may be optimized to the system administrator.

According to another preferred embodiment, a database query optimizer processes a UNION expression in a database query, and generates a WITH statement in conjunction with a UNION statement that reduces the total amount of processing compared to the original UNION statement.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 2 is a table showing expressions that may be included in a predicate expression in a database query;

FIG. 3 is a sample database query in Structured Query Language (SQL);

FIG. 4 is a predicate expression that is representative of the "where" clause in the sample database query of FIG. 2;

BEST MODE FOR CARRYING OUT THE INVENTION

1.0 Overview

Figure 1:
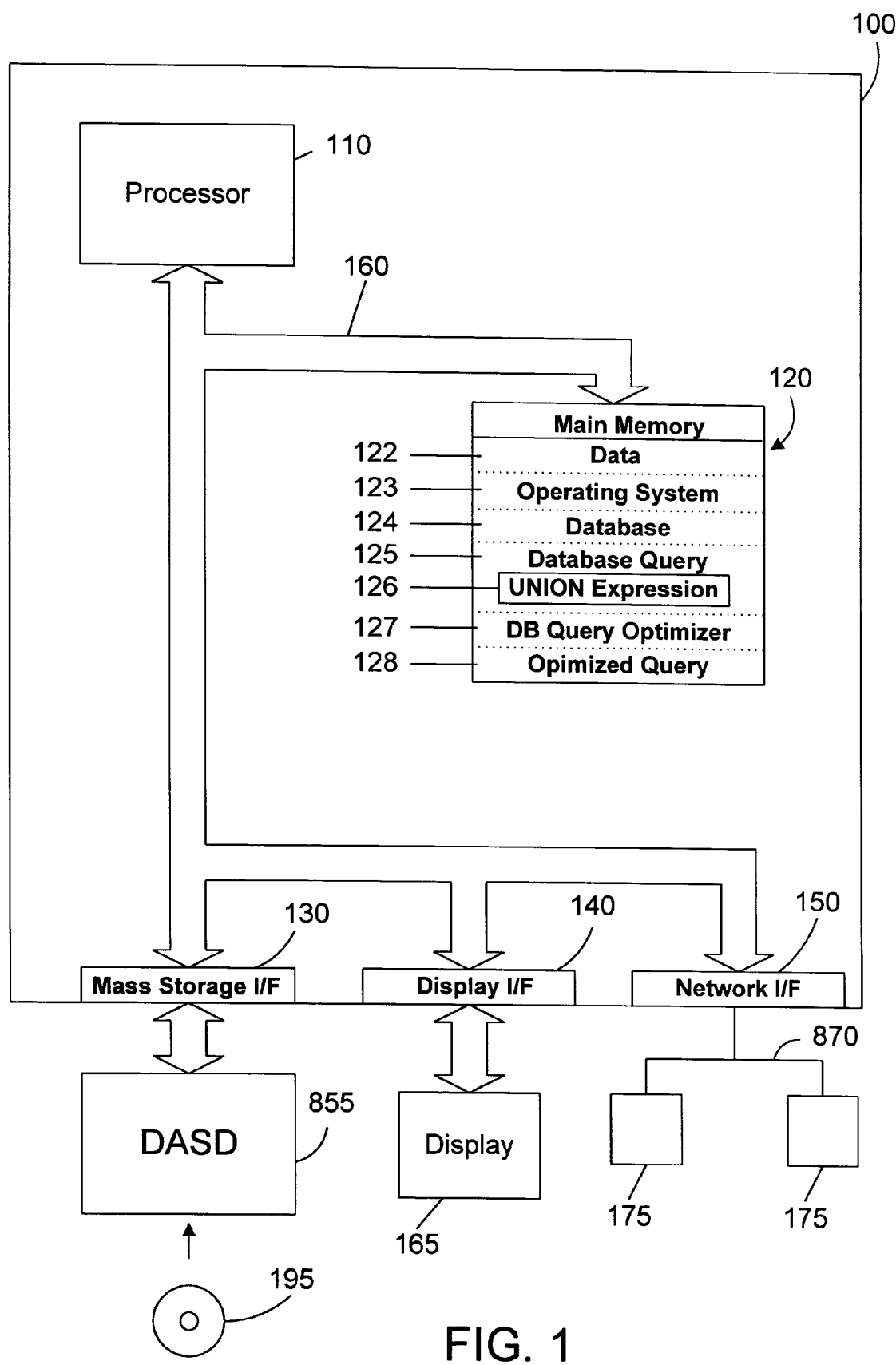
FIG. 1 is an apparatus in accordance with the preferred embodiments.

The present invention relates to optimizing database queries. For those not familiar with databases or queries, this Overview section will provide background information that will help to understand the present invention.

Known Databases and Database Queries

There are many different types of databases known in the art. The most common is known as a relational database (RDB), which organizes data in tables that have rows that represent individual entries or records in the database, and columns that define what is stored in each entry or record.

To be useful, the data stored in databases must be able to be efficiently retrieved. The most common way to retrieve data from a database is to generate a database query. A database query is an expression that is evaluated by a database manager. The expression may contain one or more predicate expressions that are used to retrieve data from a database. For example, lets assume there is a database for a company that includes a table of employees, with columns in the table that represent the employee's name, address, phone number, gender, and salary. With data stored in this format, a query could be formulated that would retrieve the records for all female employees that have a salary greater than $40,000. Similarly, a query could be formulated that would retrieve the records for all employees that have a particular area code or telephone prefix.

One popular way to define a query uses Structured Query Language (SQL). SQL defines a syntax for generating and processing queries that is independent of the actual structure and format of the database. One sample SQL query is shown in FIG. 3. The "select *" statement tells the database query processor to select all columns, the "from Table1" statement identifies which database table to search, and the "where" clause specifies one or more expressions that must be satisfied for a record to be retrieved. Note that the query of FIG. 3 is expressed in terms of columns C1, C2 and C3. Information about the internal storage of the data is not required as long as the query is written in terms of expressions that relate to values in columns from tables.

For the query of FIG. 3, the "where" clause specifies that the first column has a value equal to four (C1=4) logically ANDed with the expression that the second column is greater than six OR the third column is not equal to eight. The expression in the "where" clause of FIG. 3 is shown in FIG. 4. Where not specifically stated herein, the term "expression" is intended to mean an arbitrary predicate expression, which can be an entire expression in a query, a portion of an expression in a query, or the entire query and may include logical expressions, relational expressions, unary expressions, boolean expressions, and their combinations.

In the prior art, a tool known as a query optimizer evaluates expressions in a query. When an expression becomes complex, the query optimizer often approaches the expression from multiple perspectives. In many cases, the query optimizer will divide an expression into multiple sub-expressions. However, the query optimizer typically cannot tell when equivalent expressions exist in different parts of the query. For this reason, known query optimizers process separately the two sides of a UNION expression, not benefitting from any common components on both sides of the UNION expression.

2.0 Detailed Description

It was discovered by the inventors herein that a query union statement in the prior art database systems can often be optimized to achieve increased performance where the statement has common components on both sides of the union. The preferred embodiments provide an optimized UNION query for a database computer system where the original query includes a UNION expression having common components on both sides of the union. The common components of the UNION are extracted and the expression is reformulated so the common portions on both sides of the UNION expression are only executed one time. In a preferred embodiment, a database query optimizer processes a UNION expression in a database query, and generates a WITH statement in conjunction with a new UNION statement that reduces the total amount of processing compared to the original UNION statement.

Referring now to FIG. 1, a computer system 100 is one suitable implementation of an apparatus in accordance with the preferred embodiments of the invention. Computer system 100 is an IBM eServer iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices (such as a direct access storage device 155) to computer system 100. One specific type of direct access storage device 155 is a readable and writable CD RW drive, which may store data to and read data from a CD RW 195.

Main memory 120 in accordance with the preferred embodiments contains data 122, an operating system 123, a database 124, one or more database queries 125, a database query optimizer 127, and an optimized query 128. One or more of the database queries 125 may include one or more UNION expressions 126. Note that the UNION expression 126, the database query optimizer 127, and the optimized query 128 are described in further detail below.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 122, operating system 123, database 124, database query 125, and the database query optimizer 127 are shown to reside in main memory 120. Those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Data 122 represents any data that serves as input to or output from any program in computer system 100. Operating system 123 is a multitasking operating system known in the industry as OS/400; however, those skilled in the art will appreciate that the spirit and scope of the present invention is not limited to any one operating system. Database 124 is any suitable database, whether currently known or developed in the future. Database query 125 is a query in a format compatible with the database 124 that allows information stored in the database 124 that satisfies the database query 125 to be retrieved. Database query optimizer 127 processes one or more expressions in database query 125, including a UNION expression 126 in accordance with the preferred embodiments. Query optimizer 127 optimizes a query 125 that includes a UNION expression 126 to generate a corresponding optimized query 128.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 123. Operating system 123 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks and CD RW (e.g., 195 of FIG. 1), and transmission type media such as digital and analog communications links.

Figure 5:
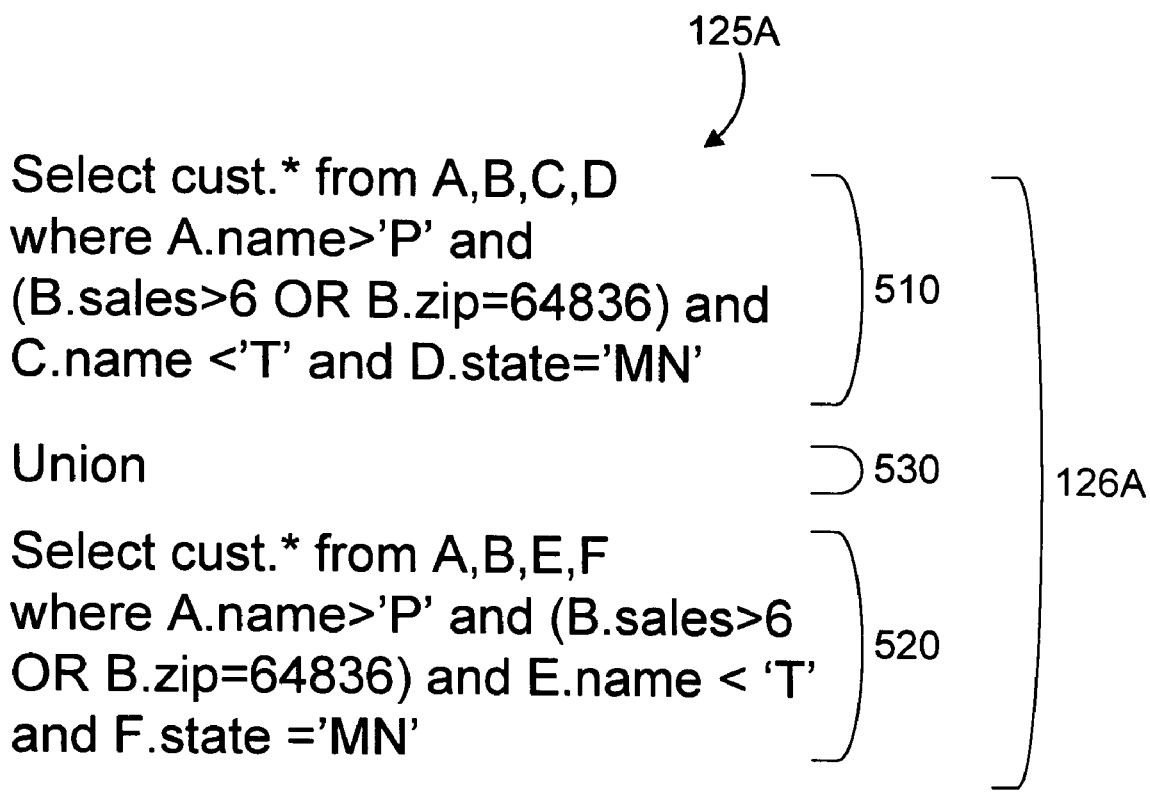
FIG. 5 is a sample UNION query statement according to the prior art.

Referring now to FIG. 5, a query 125A is shown for an example of how the query will be analyzed and reformulated in accordance with preferred embodiments. Query 125A in FIG. 5 is an illustrative example of a query 125 that resides in main memory 120 shown in FIG. 1. The query 125A has two select statements 510, 520, one on each side of a UNION operator 530. The first SELECT statement 510 operates on tables A, B, C and D, and the second SELECT statement 520 operates on tables A, B, E and F. The query optimizer 127 in the present invention analyzes the query 125A to determine that the select cust.* from tables A and B occurs on both sides of the UNION operator 530.

The query optimizer 127 then analyzes the complexity of the common components that occur on both sides of the UNION operator 530 to determine if the query 125A can be optimized. The common components must have sufficient complexity that the overhead of creating a temporary data table is more than offset by the savings of combining the common components. This is done by comparing the estimated time to run the UNION expression with the estimated time to run the optimized UNION expression plus the time to create the temporary table.

If the expression can be optimized, the query optimizer 127 may inform the database administrator that the query is a candidate for a manual process to optimize the query according to an embodiment of the present invention. In other embodiments, the optimization process to reformulate the expression is done automatically by the query optimizer 127.

Figure 6:
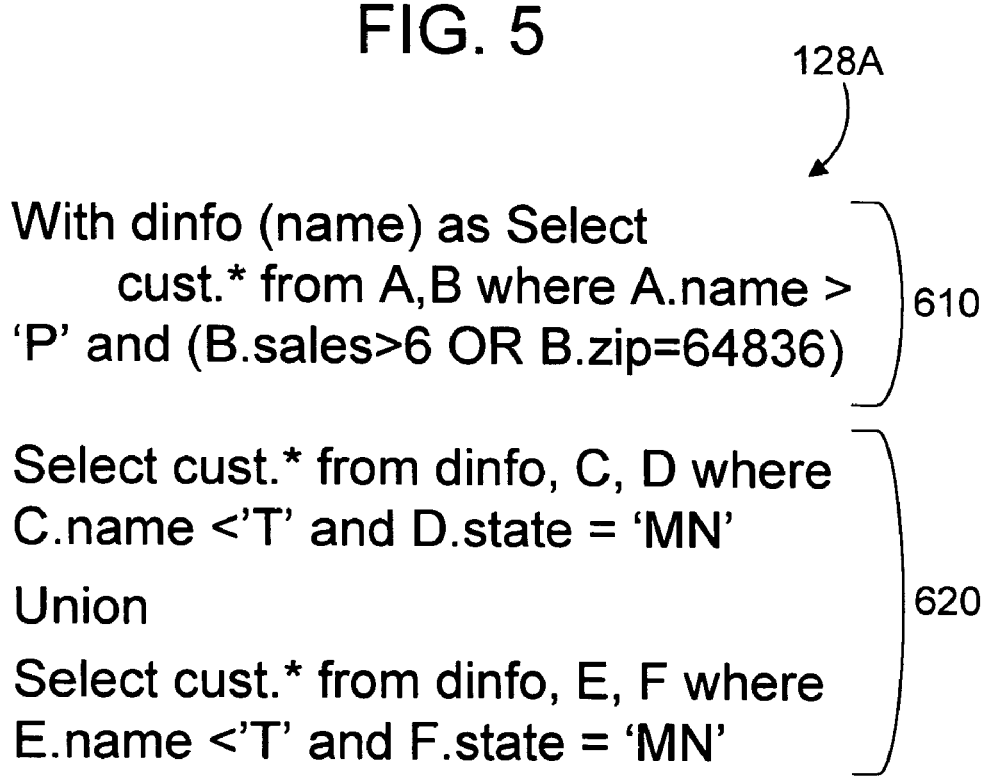
FIG. 6 is a modified UNION query statement according to the preferred embodiments.

Referring now to FIG. 6, an optimized query 128A is shown according to an embodiment of the present invention. Optimized query 128A is one specific example of optimized query 128 in FIG. 1. If the original UNION query 125A that contains a UNION expression 126A in FIG. 5 can be optimized, then the query optimizer 127 formulates a WITH statement 610 that creates a temporary table "dinfo" that contains the data of the common components on both sides 510 and 520 of UNION expression 126A in FIG. 5. The query optimizer 127 further creates a reformulated UNION statement 620 that selects from the temporary table dinfo created in the WITH statement and the non-common components of the original query 125A.

Figure 7:
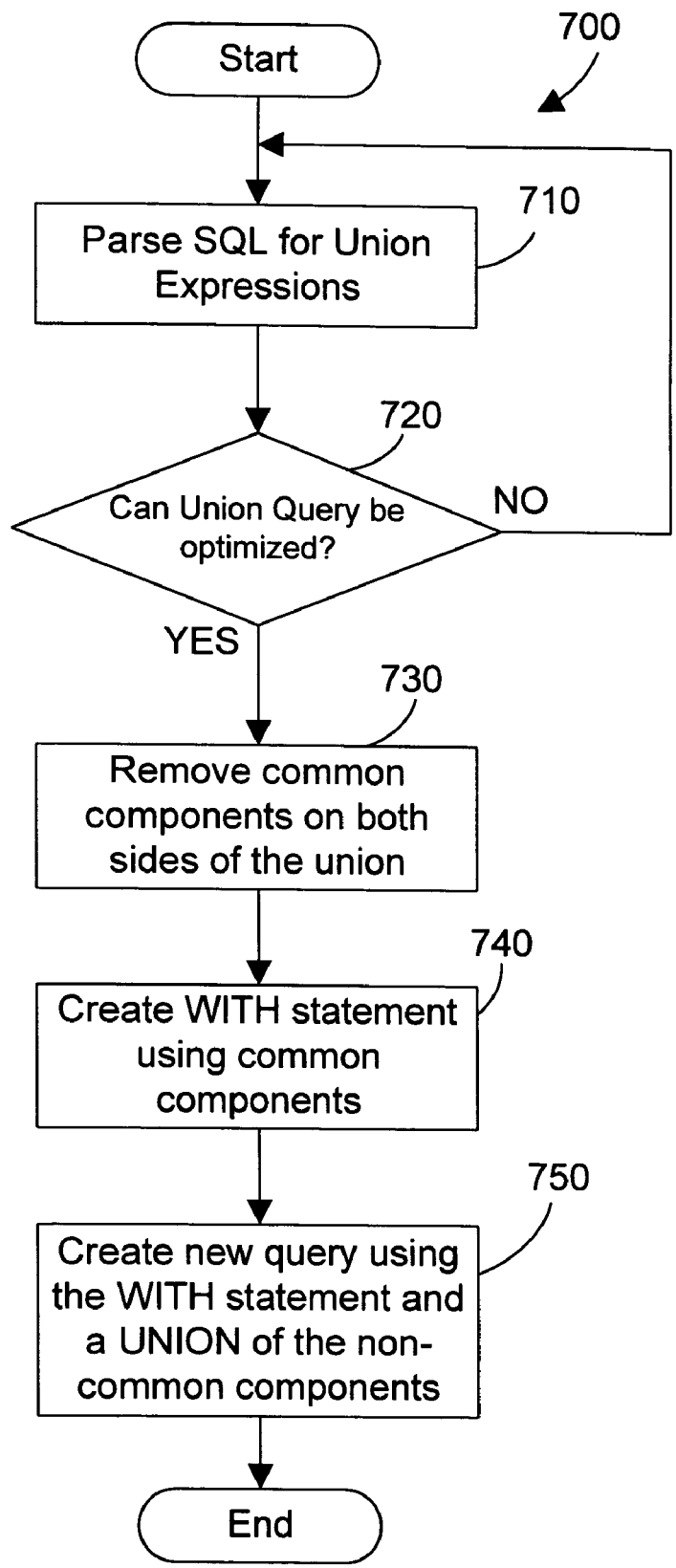
FIG. 7 is a flow diagram of a method according to an embodiment of the present invention.

Referring now to FIG. 7, method 700 is illustrated for evaluating a query that includes a UNION expression in accordance with the preferred embodiments. Method 700 begins by parsing the query or set of queries to find a UNION expression (step 710). Having found a UNION expression, method 700 then determines whether the query that includes the UNION expression can be optimized (step 720). To be optimized, the query must have common components on both sides of the UNION operator, and the common components must have sufficient complexity that the overhead of creating a temporary data table is more than offset by the savings of combining the common components so they are only executed once. If the UNION query cannot be optimized (step 720=no), then method 700 returns to step 710 to look for more UNION expressions. If the UNION query can be optimized (step 720=yes), method 700 then removes the common components from both sides of the UNION expression (step 730). These common components are used to create a WITH statement, which creates a temporary data table with the common components (step 740). Method 700 then creates a new query which is the UNION of the temporary data table "dinfo" created in the WITH statement and the non-common components (step 750).

The present invention as described with reference to the preferred embodiments provides significant improvements over the prior art. A query with a UNION expression is analyzed to determine if the query can be optimized, and if so, common portions on both sides of the UNION expression are extracted and the expression is reformulated so the common portions on both sides of the UNION statement are only run one time. The present invention provides a way to reduce database query time to improve system performance, and reduce excessive delays in database accesses.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. An apparatus comprising:
   at least one processor;
   a memory coupled to the at least one processor;
   a query residing in the memory that includes a UNION-type expression;
   a query optimizer residing in the memory and executed by the at least one processor, wherein the query optimizer determines there are common components on both sides of the UNION-type expression of sufficient complexity that optimization is achievable by processing the UNION-type expression to a different form by comparing the estimated time to run the UNION-type expression with the estimated time to run the optimized UNION-type expression plus the time to create a temporary data structure; and
   wherein the query optimizer removes a common component from both sides of the UNION-type expression in the query and formulates the common component into the temporary data structure using a WITH statement, and processes the query so non-common components are in a reformulated UNION-type expression, and generates a new query that includes the WITH statement and the reformulated UNION-type expression.

2. The apparatus of claim 1 wherein the UNION-type expression includes at least one of the following UNION-type operators: UNION, UNION ALL, INTERSECT and MINUS.

3. The apparatus of claim 1 wherein the query optimizer further notifies a system administrator that the query can be optimized.

4. A method for optimizing a database query that contains a UNION-type expression, the method comprising the steps of:

identifying at least one common component on both sides of the UNION-type expression;

determining the complexity of the at least one common component is sufficient that optimization is achievable by reformulating the database query by comparing the estimated time to run the UNION-type expression with the estimated time to run the optimized UNION-type expression plus the time to create a temporary data structure;

reformulating the UNION-type expression to a WITH statement and a reformulated UNION-type expression by the following two steps:

removing a common component from both sides of the UNION-type expression and formulating the common component into the temporary data structure using a WITH statement, and generating the reformulated UNION-type expression using non-common components in the UNION-type expression and the temporary data structure.

5. The method of claim 4 further comprising the step of notifying a system administrator that the UNION-type expression is optimizable.

6. The method of claim 4 wherein the UNION-type expression includes at least one of the following UNION-type operators: UNION, UNION ALL, INTERSECT and MINUS.

7. A program product comprising:

(A) a query optimizer that determines there are common components on both sides of the UNION-type expression of sufficient complexity that optimization is achievable by processing the UNION-type expression to a different form by comparing the estimated time to run the UNION-type expression with the estimated time to run the optimized UNION-type expression plus the time to create a temporary data structure;

wherein the query optimizer processes the UNION-type expression to a different form by the following two steps:

removing at least one common component from both sides of the UNION-type expression and formulating the at least one common component into the temporary data structure using a WITH statement; and generating a reformulated UNION-type expression using non-common components in the UNION-type expression and the temporary data structure; and (B) computer-recordable disk media bearing the query optimizer.

8. The program product of claim 7 wherein the UNION-type expression is a portion of a query to a database.

9. The program product of claim 7 wherein the UNION-type expression includes at least one of the following UNION-type operators: UNION, UNION ALL, INTERSECT and MINUS.

* * * * *